United States Patent Office 3,016,985
Patented Jan. 16, 1962

3,016,985
METHOD OF RECOVERY OF ACETYLENE
AND ETHYLENE
George A. Akin, Kingsport, Tenn., assignor to Eastman Kodak Company, Rochester, N.Y., a corporation of New Jersey
No Drawing. Filed Dec. 28, 1959, Ser. No. 862,084
10 Claims. (Cl. 183—115)

This invention relates to a purification process for gaseous hydrocarbon mixtures and more particularly to the recovery of substantially pure acetylene and ethylene from gaseous mixtures containing the same. In a specific aspect this invention relates to the separation of acetylene and ethylene from gaseous mixtures using absorption and countercurrent extraction procedures.

It is well known that the simultaneous recovery of acetylene and ethylene is particularly difficult because of the hazards of operating under temperatures and pressures which might otherwise be used for effective gas separation. These hazards result from the fact that acetylene is unusual among gases in that at pressures higher than about 1.5 atmospheres absolute, it is unstable to the extent of being subject to explosions. The exact critical pressure required for susceptibility to explosion is dependent upon a number of variables including the temperature, but at normal temperatures the value is about 1.5 atmospheres. For this reason, the amount of acetylene which can be dissolved in one of the selective solvents and handled safely is limited by the concentration necessary to produce pressures in the hazardous range in the vapor phase in equipment used in subsequent operations.

According to the data of Boesler, FIAT Final Report No. 720, the partial pressure of acetylene in a gas mixture which can be handled safely is higher in mixtures dilute in acetylene. For example, in gas mixtures containing equal molar quantities of acetylene and ethylene, the limit of safe partial pressure of acetylene is about 4 atmospheres absolute, compared with 1.5 atmospheres absolute for pure acetylene. Thus, while acetylene can be handled safely at relatively high pressures in the gaseous state when diluted with other gases, acetylene concentration equipment is subject to explosion hazards when operated at these high pressures in those sections where concentrated acetylene exists in the vapor phase. To avoid these hazards the equipment is usually operated at lower pressures with a resulting increase in equipment size and solvent requirements.

Two of the more common methods devised for the separation of acetylene and ethylene from gaseous mixtures containing the same involve the recovery of these gases by low temperature fractionation, i.e. distillation employing high pressures, or the recovery of these gases by absorbing both of them in a selective solvent, desorbing the acetylene and ethylene from the solvent to obtain an acetylene-ethylene mixture which is available for separation. Acetylene is then absorbed from this stream using a selective solvent and the gases are separated as products. However, in view of the fact that acetylene is present in the gas phase in each of these methods, the hazards set forth above require careful consideration. Furthermore, a combination of desorption and reabsorption steps results in a considerable heat effect since the heat of solution warms the solvent which in turn necessitates the use of additional solvent or heat exchange means.

By the practice of the present invention the hazards which can result from the gas-phase concentration of acetylene are entirely eliminated. This is accomplished by employing absorption, stripping, and countercurrent extraction procedures which keep all of the acetylene being treated in the liquid phase until after the pressure is reduced so that no hazardous gas phase concentration of acetylene will exist. Furthermore, the present invention provides a method for separating acetylene and ethylene from gaseous mixtures which avoids any combination of desorption and reabsorption steps thus resulting in a shorter, simpler and more economical process than those processes which do employ such a combination of steps. Moreover, additional economies can be realized by operating the process of the instant invention in a continuous manner, i.e. recycling the solvents and extractants, employed for reuse in their respective steps, and employing heat exchange procedures to reduce the heat and refrigeration requirements of the process.

Accordingly, it is an object of this invention to separate acetylene and ethylene from gas mixtures containing the same.

A further object of this invention is to separate acetylene and ethylene from gas mixtures using absorption and countercurrent extraction procedures.

Another object of this invention is to avoid the hazardous gas-phase concentration of acetylene in a process for the simultaneous separation of acetylene and ethylene from gaseous mixtures.

A still further object is to obtain a cost advantage over prior art processes employing absorption and desorption steps by eliminating such steps and thereby removing the necessity for using additional solvent or refrigeration which would result from the use of such steps.

The above objects are attained in accordance with my invention by providing an advantageous novel sequence of steps which are designed to effect the safe, efficient and economical removal of acetylene and ethylene from gas streams. Such streams can result, for example, from the pyrolysis of hydrocarbon feed stocks according to the process disclosed in U.S. 2,790,838. The novel process of this invention comprises absorbing both acetylene and ethylene from such a gaseous mixture by contacting said mixture with a liquid hydrocarbon solvent, removing acetylene from said hydrocarbon solvent by continuous countercurrent extraction with a selective solvent which is immiscible with said hydrocarbon solvent and separating acetylene from said selective solvent and ethylene from said hydrocarbon solvent.

The temperatures to be employed in the liquid hydrocarbon absorption step can range from about $-70°$ C. to about ambient temperature, the preferred temperature being less than ambient, that is, about $-15$ to about $-30°$ C. since the amount of hydrocarbon solvent necessary to absorb the acetylene and ethylene increases as the temperature increases. Furthermore, low temperatures are preferred since the reduction in the amount of solvent which results will in turn reduce the amount of extractant which is required, although the higher temperatures are operative and must be used in some cases where the freezing point of the solvent must be considered. However, the use of these low temperatures requires that the gas fed into the extratction tower be dried in order to prevent any water which is present from freezing and clogging the absorption tower. Such water can result, for example, from the use of aqueous monoethanol amine in the removal of carbon dioxide from the gas stream in accordance with one embodiment of the process.

It has been found that excellent results are obtained when pressures above atmospheric, for example, about 5 to about 15 atmospheres are employed in the practice of the invention. The higher pressures are preferred since this reduces the quantity of solvent and extractant which must be used, but if the pressure is too high, the compression costs become too great to warrant attempting to economize on the amount of solvent and extractant employed.

Any hydrocarbon solvents which are immiscible with the acetylene extractant under the conditions employed may be used in the practice of this invention. Such hydrocarbons are well known in the art and include, for example, hexane, cyclohexane, decane, dodecane and kerosene. It should be noted, however, that hydrocarbons such as cyclohexane, kerosene and dodecane freeze or are very viscous at low temperatures and for this reason they are difficult or impossible to work with under the lower temperature conditions described. It should be pointed out that acetylene is less soluble than ethylene in many hydrocarbon solvents. To reduce the amount of hydrocarbon solvent required to remove all of the acetylene and ethylene from the gas mixture a small amount of the selective solvent, such as dimethyl formamide, may be fed to the absorption tower along with the hydrocarbon solvent. Conversely, any acetylene extractant which is immiscible with the hydrocarbon solvent under the conditions employed is operative in the practice of this invention. Suitable extractants include, for example, dimethylformamide, dimethylacetamide, and diethylformamide. In some cases, as with diethylformamide and hexane, it may be necessary to add a small amount of water to the selective solvent to provide immiscibility. In the event that the process of the instant invention is continued over a long period, it may be desirable to purify both the extractant and the solvent streams which are employed, but where shorter operating times are employed such purification procedures would not be warranted.

Prior to treatment in my recovery system, the gas stream is generally passed through quench apparatus and treated in an oil absorption tower. The quench step removes tarry materials and other undesirable components which have a tendency to foul processing equipment and generally make the recovery of acetylene and ethylene more difficult while the oil absorption step serves to remove the $C_3$ and heavier hydrocarbons.

The invention is illustrated by the following examples of certain preferred embodiments thereof, although it will be understood that the invention is not limited thereby unless otherwise specifically indicated. All quantities mentioned in the examples correspond to those used per 100 cubic feet of gas measured at standard conditions, unless otherwise indicated.

*Example 1*

A gas stream resulting from a cracking operation containing about 10% ethylene, 10% acetylene, and 8% carbon dioxide, after having the heavier hydrocarbons removed by a preliminary operation was passed to an absorption tower operated at a temperature of about —20° and a pressure of about 7 atmospheres absolute. Hexane was used as the solvent. It was fed to the top of the absorption tower at a rate of about 25 gallons per hundred cubic feet of the gas stream measured at standard conditions. Essentially all of the carbon dioxide, acetylene and ethylene were absorbed from the gas. However, some of the other gases such as methane, carbon monoxide, and hydrogen were also dissolved in the solvent. The solvent from the bottom of the absorption tower was fed to the middle of an extraction tower fed at the top with 10 gallons of dimethylformamide. This quantity of selective solvent was sufficient to remove essentially all of the carbon dioxide and acetylene from the hexane solution. However, to prevent contamination of the dimethylformamide stream with the ethylene and the other gases, such as methane mentioned above, a small amount, about six gallons, of hexane was fed into the bottom of the extraction tower. The bottom stream from the extraction tower containing the carbon dioxide, acetylene, and dimethylformamide saturated with hexane was passed to a fractional stripping tower operated at a pressure of 1.2 atmospheres absolute where the carbon dioxide was removed and then to a final stripping tower where the acetylene was recovered. Since, in this case, the presence of moisture in these two gas streams was not undesirable, they were washed with water and a hydrocarbon solvent to recover the traces of dimethylformamide and hexane which they contained. The hexane stream from the top of the extraction tower was passed to a fractional stripping tower where the gaseous impurities such as methane, carbon monoxide and hydrogen were driven off by heating at essentially atmospheric pressure. From the bottom of this stripping tower the hexane stream was passed into a final stripping unit to recover the ethylene.

*Example 2*

A quenched compressed gas stream from a cracking operation containing about 6% ethylene, 4% acetylene, and 5% carbon dioxide was first treated by passing through an oil absorption tower at a pressure of about 10 atmospheres and a temperature of 2° C. to remove the $C_3$ and heavier hydrocarbons. About 8 gallons of a kerosene fraction were used per 100 standard cubic foot of gas. To reduce the loss of appreciable quantities of acetylene and ethylene from the system, the pressure was reduced on the oil leaving this tower and the gases which flashed off were returned to the cracked gas stream ahead of the compressor. The $C_3$ and heavier hydrocarbons were then stripped from the kerosene by the use of steam and the kerosene after cooling was stored for recycling to the absorption tower.

The carbon dioxide in the cracked gas was removed by scrubbing in the conventional manner using monoethanol amine solution and the resulting carbon dioxide free gas was dried using an adsorptive clay to lower the dew point to approximately —40° C. This dried gas stream was cooled to —30° C. and passed to an absorption tower which was fed with hexane, also at about —30° C. Approximately 12 gallons of hexane were used per 100 standard cubic foot of gas. Our next step was to extract the acetylene from the hexane in a continuous countercurrent extraction tower. The hexane stream containing the acetylene, ethylene and some gaseous impurities was fed to the tower at a point just below the center and flowed up the tower against a descending stream of about 0.7 gallon of cold dimethylformamide. This amount was sufficient to extract essentially all of the acetylene out of the hexane stream. To prevent the contamination of the acetylene with a small amount of ethylene and with the other gaseous impurities a small amount of hexane, about 1 gallon, was fed to the bottom of the extraction tower as in Example 1. The hexane stream from the extraction tower was first fractionally stripped to remove the gaseous impurities and then finally stripped to recover ethylene in a relatively pure state. Acetylene was recovered from the dimethylformamide streams, and the solvent streams were stored for recycling.

As is readily apparent from an examination of the preceding examples certain economic and advantageous features form a part of this invention. For example, gases such as methane, carbon monoxide and hydrogen which can become dissolved in the hydrocarbon solvent during the absorption step may be removed by contacting this solvent stream with ethylene in a fractional stripping tower. The ethylene used in the tower can be recycled from the separation zone. Furthermore, the loss of ethylene in the overhead gas stream from this tower can be prevented by feeding a small amount of hydrocarbon solvent at the top. Furthermore, the hydrocarbon solvent and the extractant may be recycled to the processing zones after being stripped of ethylene and acetylene respectively.

The process of the invention is subject to several variations, for example, by operating the extraction tower in Example 1 with a small quantity of dimethylformamide, approximately 1.5 gallons, it is possible to leave the carbon dioxide in the hydrocarbon solvent overhead stream.

This variation would then require removal of carbon dioxide from this stream by a solvent for carbon dioxide such as aqueous monoethanolamine or from the gaseous ethylene stream by similar methods after the gases are stripped from the solvent.

It is also possible to use as an acetylene and carbon dioxide extractant a solution of a carbon dioxide absorbent such as monoethanolamine in dimethylformamide. In this case only about 2 gallons of this solution will be required in the extraction tower and also a reduction of the hexane fed into the bottom of this tower can be achieved (to about 2 gallons) without loss of product purity. The dimethylformamide solution is then treated to first remove acetylene and then by high temperature stripping to remove the carbon dioxide.

Of course, if in Example 1 carbon dioxide is removed from the gas stream prior to the absorption in hexane, the extraction step is quite simple in that only about 1.5 gallons of dimethylformamide and fresh hexane are fed into the extraction tower. Acetylene and ethylene are easily recovered from the two streams leaving the extraction unit.

Although the invention has been described in considerable detail with reference to certain preferred embodiments thereof, variations and modifications can be effected within the spirit and scope of the invention as described hereinabove and as defined in the appended claims.

I claim:

1. In a process for resolving a gaseous mixture containing acetylene and ethylene, the improvement which comprises absorbing both acetylene and ethylene from the gaseous mixture by contacting said mixture with a liquid hydrocarbon solvent, removing acetylene from said hydrocarbon solvent by continuous countercurrent extraction with a selective solvent which is immiscible with said hydrocarbon solvent and separating acetylene from said selective solvent and ethylene from said hydrocarbon solvent.

2. In a process for resolving a gaseous mixture containing acetylene and ethylene, the improvement which comprises absorbing both acetylene and ethylene from the gaseous mixture by contacting said mixture with a liquid hydrocarbon solvent, removing acetylene from said hydrocarbon solvent by continuous countercurrent extraction with a selective solvent which is immiscible with said hydrocarbon solvent, separating acetylene from said selective solvent and ethylene from said hydrocarbon solvent, and recycling the liquid hydrocarbon to the absorption step and the selective solvent to the extraction step.

3. In a process for resolving a gaseous mixture containing acetylene and ethylene, the improvement which comprises absorbing both acetylene and ethylene from the gaseous mixture by contacting said gaseous mixture with a liquid hydrocarbon solvent at a pressure within the range of about 5 to about 15 atmospheres, removing acetylene from said hydrocarbon solvent by continuous countercurrent extraction with a selective solvent which is immiscible with said hydrocarbon solvent and separating acetylene from said selective solvent and ethylene from said hydrocarbon solvent.

4. In a process for resolving a gaseous mixture containing acetylene and ethylene, the improvement which comprises absorbing both acetylene and ethylene from the gaseous mixture by contacting said gaseous mixture with a liquid hydrocarbon solvent at a temperature within the range of about $-70°$ C. to about ambient temperature and a pressure within the range of about 5 to about 15 atmospheres, removing acetylene from said hydrocarbon solvent by continuous countercurrent extraction with a selective solvent which is immiscible with said hydrocarbon solvent and separating acetylene from said selective solvent and ethylene from said hydrocarbon solvent.

5. In a process for resolving a gaseous mixture containing acetylene and ethylene, the improvement which comprises absorbing both acetylene and ethylene from the gaseous mixture by contacting said gaseous mixture with hexane at a temperature within the range of about $-70°$ C. to about ambient temperatures and a pressure within the range of about 5 to about 15 atmospheres, removing acetylene from said hydrocarbon solvent by continuous countercurrent extraction with a selective solvent which is immiscible with said hydrocarbon solvent and separating acetylene from said selective solvent and ethylene from said hydrocarbon solvent.

6. In a process for resolving a gaseous mixture containing acetylene and ethylene, the improvement which comprises absorbing both acetylene and ethylene from the gaseous mixture by contacting said gaseous mixture with hexane at a temperature within the range of about $-70°$ C. to about ambient temperature and a pressure within the range of about 5 to about 15 atmospheres, removing acetylene from said hydrocarbon solvent by continuous countercurrent extraction with dimethylformamide and separating acetylene from dimethylformamide and ethylene from said hexane.

7. In a process for resolving a gaseous mixture containing acetylene and ethylene, the improvement which comprises absorbing both acetylene and ethylene from the gaseous mixture by contacting said gaseous mixture with hexane at a temperature within the range of about $-70°$ C. to about ambient temperature and a pressure within the range of about 5 to about 15 atmospheres, removing acetylene from said hydrocarbon solvent by continuous countercurrent extraction with diethylformamide and separating acetylene from diethylformamide and ethylene from said hexane.

8. In a process for resolving a gaseous mixture containing acetylene and ethylene, the improvement which comprises absorbing both acetylene and ethylene from the gaseous mixture by contacting said gaseous mixture with hexane at a temperature within the range of about $-15°$ C. to about ambient temperature and a pressure within the range of about 5 to about 15 atmospheres, removing acetylene from said hydrocarbon solvent by continuous countercurrent extraction with dimethylacetamide and separating acetylene from dimethylacetamide and ethylene from said hexane.

9. In a process for resolving a gaseous mixture containing acetylene and ethylene, the improvement which comprises absorbing both acetylene and ethylene from the gaseous mixture by contacting said mixture with hexane at a pressure of about 7 atmospheres and a temperature of about $-20°$ C., removing acetylene from said hexane by continuous countercurrent extraction with dimethylformamide and stripping acetylene from said dimethylformamide and ethylene from said hexane.

10. In a process for resolving a gaseous mixture containing acetylene and ethylene, the improvement which comprises absorbing both acetylene and ethylene from the gaseous mixture by contacting said mixture with hexane at a pressure of about 10 atmospheres and a temperature of about $-30°$ C., removing acetylene from said hexane by continuous countercurrent extraction with dimethylformamide and stripping acetylene from said dimethylformamide and ethylene from said hexane.

References Cited in the file of this patent

UNITED STATES PATENTS

| 1,938,991 | Wulff | Dec. 12, 1933 |
| 2,659,453 | Robinson | Nov. 17, 1953 |
| 2,714,940 | Milligan | Aug. 9, 1955 |